UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

YELLOW TETRAZO DYE.

SPECIFICATION forming part of Letters Patent No. 516,468, dated March 13, 1894.

Application filed August 28, 1893. Serial No. 484,197. (Specimens.) Patented in France January 27, 1893, No. 227,474.

*To all whom it may concern:*

Be it known that I, JOHANN JAKOB BRACK, a citizen of the Swiss Republic, residing at Basle, Switzerland, have invented certain new and useful Improvements in the Manufacture of Tetrazoic Coloring-Matters, (for which the firm of L. DURAND, HUGUENIN & CIE., in St. Fons, near Lyons, France, in Basle, Switzerland, and in Hüningen, Germany, has received Letters Patent in France, No. 227,474, dated January 27, 1893,) of which the following is a specification.

This invention relates to the manufacture of new, yellow, tetrazo coloring matters derived from diamido bases obtained by the condensation of formaldehyde with a paradiamin, such for instance as benzidin and tolidin, and the hydrochlorate of such paradiamin. These new coloring matters dye unmordanted cotton, in an alkaline bath, and are obtained by combining the tetrazo derivatives of the said diamido bases with a carboxylic acid, such as salicylic acid for example. By way of example I will describe specifically the method employed for obtaining two of these coloring matters.

(a) A coloring matter obtained by the combination of salicylic acid with the tetrazo derivative of the diamido base derived from formic aldehyde, benzidin and hydrochlorate of benzidin: 3.8 kilos of the new base obtained by the condensation of formic aldehyde (formaldehyde) with benzidin and hydrochlorate of benzidin, are diazotized in the usual way by means of eight kilos of hydrochloric acid at 21° Baumé and 1.4 kilos of sodium nitrite. The tetrazo derivative thus obtained is then poured into a solution of 2.8 kilos of salicylic acid in twenty kilos of caustic soda lye of twenty to thirty per cent., care being taken to agitate well. In a short time the formation of the coloring matter will be complete and said matter will be deposited as a brown precipitate, which is separated by filtration, pressed and dried. The coloring matter then appears as a brown powder readily soluble in water and capable of dyeing unmordanted cotton, in an alkaline bath, a yellow color. A solution of the coloring matter in concentrated sulfuric acid has a red-brown color.

(b) A coloring matter obtained by the combination of salicylic acid with the tetrazo derivative of the diamido base derived from formic aldehyde, tolidin and hydrochlorate of tolidin: By substituting for the 3.8 kilos of the condensation product of formic aldehyde, benzidin and hydrochlorate of benzidin given in the preceding example, 4.3 kilos of the condensation product of formic aldehyde, tolidin and hydrochlorate of tolidin, there is obtained a coloring matter capable of dyeing unmordanted cotton a yellow color somewhat redder in tone than that produced by the coloring matter of example (a). A solution of the coloring matter of example (b) in concentrated sulfuric acid has, also, a red-brown color. This product of example (b) is a beautiful and important coloring matter for dyeing. It has, probably, the following constitutional formula:

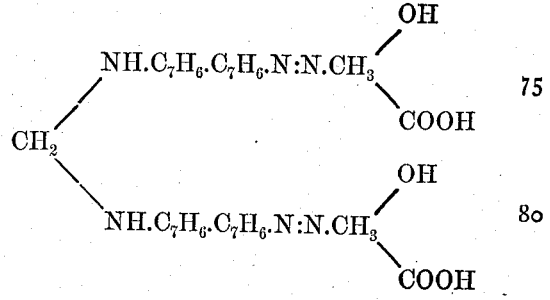

Having thus described my invention, I claim—

1. The herein described method of manufacturing yellow, tetrazoic coloring matters, which consists in combining two molecules of a carboxylic acid with one molecule of the tetrazo derivative of the diamido base obtained by condensing formaldehyde with a paradiamin and a hydrochlorate of paradiamin, substantially as set forth.

2. The herein described method of manufacturing a yellow, tetrazoic coloring matter, which consists in first preparing a diamido base by the condensation of formaldehyde with a paradiamin and a hydrochlorate of said paradiamin and diazotizing in the usual way, then mixing the tetrazo derivative thus obtained with a solution of a carboxylic acid in an alkali all in about the proportions specified, and finally separating and drying the deposited coloring matter.

3. The herein described method of manufacturing a yellow, tetrazoic coloring matter, which consists in adding to a solution of salicylic acid in an alkali, the tetrazo derivative of a diamido-base obtained by the condensation of formaldehyde with a paradiamin and a hydrochlorate of said paradiamin, all in substantially the proportions specified, and finally removing and drying the precipitate, substantially as set forth.

4. The herein described method of manufacturing a yellow, tetrazoic coloring matter, which consists in adding to a solution of salicylic acid in an alkali, the tetrazo derivative of a diamido-base obtained by the condensation of formaldehyde with tolidin and hydrochlorate of tolidin, all in about the proportions specified, and finally removing and drying the precipitate, as set forth.

5. The new yellow, tetrazoic coloring matter herein described, derived from salicylic acid and the condensation product of formaldehyde with a paradiamin and a hydrochlorate of said paradiamin, the said coloring matter being, in a dry state, a brownish powder readily soluble in water, capable of dyeing unmordanted cotton, in an alkaline bath, a yellow color, and producing a red-brown color when dissolved in concentrated sulfuric acid, as set forth.

In witness whereof I have hereunto signed my name in the presence of two subscribing witnesses.

JOHANN JAKOB BRACK.

Witnesses:
GEORGE GIFFORD,
AMAND RITTER.